(12) United States Patent
Arakawa et al.

(10) Patent No.: US 9,013,742 B2
(45) Date of Patent: Apr. 21, 2015

(54) DESTINATION-TO-SAVE-DATA SPECIFYING SYSTEM, INFORMATION PROCESSING APPARATUS, AND COMPUTER-READABLE NON-TRANSITORY STORAGE MEDIUM WITH DESTINATION-TO-SAVE-DATA SPECIFYING PROGRAM STORED THEREON

(71) Applicant: KYOCERA Document Solutions Inc., Osaka (JP)

(72) Inventors: Hiroki Arakawa, Osaka (JP); Yasuhiro Sekiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/943,042

(22) Filed: Jul. 16, 2013

(65) Prior Publication Data
US 2014/0029048 A1 Jan. 30, 2014

(30) Foreign Application Priority Data
Jul. 25, 2012 (JP) .................... 2012-165270

(51) Int. Cl.
G06F 3/12 (2006.01)
G06K 15/00 (2006.01)
(Continued)

(52) U.S. Cl.
CPC .......... H04N 1/0097 (2013.01); G06K 15/1888 (2013.01); H04N 1/00 (2013.01); H04N 1/32 (2013.01); H04N 1/00228 (2013.01);
(Continued)

(58) Field of Classification Search
CPC .................. H04N 2201/0094; H04N 1/00204; G06Q 10/10; G06F 21/608; G06F 21/62
See application file for complete search history.

(56) References Cited

U.S. PATENT DOCUMENTS 7,930,307 B2 4/2011 Igari
8,477,347 B2 7/2013 Miyamoto
(Continued)

FOREIGN PATENT DOCUMENTS

JP 2002-297467 A 10/2002
JP 2005-191777 A 7/2005
(Continued)

OTHER PUBLICATIONS

Notice of Rejection mailed by Japan Patent Office on Aug. 5, 2014 in the corresponding Japanese patent application No. 2012-165270—8 pages.

(Continued)

Primary Examiner — Thomas Lett
(74) Attorney, Agent, or Firm — Knobbe, Martens, Olson & Bear LLP

(57) ABSTRACT

A destination-to-save-data specifying system includes a computer and an image forming apparatus. In the computer, when a user interface section accepts an operator's destination-to-save-data specifying command for a folder on the computer, an accompanying information management section acquires accompanying information, including a path name, from the folder and allows a communication section to transmit the acquired accompanying information to the image forming apparatus. In the image forming apparatus, a destination-to-save-data specifying section uses the accompanying information received by the accompanying information receiving section to specify the folder identified by the accompanying information as a destination to save data output from the image forming apparatus.

6 Claims, 8 Drawing Sheets

(51) Int. Cl.
  *H04N 1/00* (2006.01)
  *G06K 15/02* (2006.01)
  *H04N 1/32* (2006.01)
(52) U.S. Cl.
  CPC .... *H04N1/32128* (2013.01); *H04N 2201/3229* (2013.01); *H04N 2201/0039* (2013.01); *H04N 2201/0094* (2013.01)

(56) References Cited

U.S. PATENT DOCUMENTS

| | | | |
|---|---|---|---|
| 8,547,584 B2 | 10/2013 | Sato | |
| 2003/0025934 A1* | 2/2003 | Takamiya | 358/1.15 |
| 2010/0097645 A1 | 4/2010 | Sato | |
| 2011/0019226 A1* | 1/2011 | Tsujimoto | 358/1.15 |

FOREIGN PATENT DOCUMENTS

| | | |
|---|---|---|
| JP | 2006-140763 A | 6/2006 |
| JP | 2006-157249 A | 6/2006 |
| JP | 2007-295037 A | 11/2007 |
| JP | 2007-306383 A | 11/2007 |
| JP | 2008-278370 A | 11/2008 |
| JP | 2010-102452 A | 5/2010 |
| JP | 2010-135910 A | 6/2010 |

OTHER PUBLICATIONS

Decision of Rejection mailed by Japan Patent Office on Dec. 2, 2014 in the corresponding Japanese patent application No. 2012-165270 —4 pages.

* cited by examiner

DESTINATION-TO-SAVE-DATA SPECIFYING SYSTEM, INFORMATION PROCESSING APPARATUS, AND COMPUTER-READABLE NON-TRANSITORY STORAGE MEDIUM WITH DESTINATION-TO-SAVE-DATA SPECIFYING PROGRAM STORED THEREON

INCORPORATION BY REFERENCE

This application claims priority to Japanese Patent Application No. 2012-165270 filed on Jul. 25, 2012, the entire contents of which are incorporated by reference herein.

BACKGROUND

The present disclosure relates to a destination-to-save-data specifying system, an information processing apparatus, a computer-readable non-transitory storage medium with destination-to-save-data specifying program stored thereon and an image forming apparatus and particularly relates to a technique for specifying a folder serving as a destination to save data output from an image forming apparatus to an information processing apparatus.

Image forming apparatuses are often equipped with the function of outputting data acquired by scanning or the like to a computer connected thereto via a network to allow the data to be stored in a folder on the computer. There is also proposed an image forming apparatus which is equipped with a so-called SMB (sever message block) transmission function of outputting data, without the need for a file server, from the image forming apparatus to a computer to allow the data storage in a folder on the computer. An example of such an apparatus is a network multi-address transmission apparatus capable of multi-address reply to all of multiple destinations using an SMB file-sharing protocol.

SUMMARY

The present disclosure proposes a technique improved over the above known techniques.

A destination-to-save-data specifying system according to one aspect of the present disclosure includes: a control unit assembled in an information processing apparatus; and a control unit assembled in an image forming apparatus configured to communicate with the information processing apparatus.

The control unit of the information processing apparatus includes an interface section, a communication section, and an accompanying information management section.

The interface section is configured to accept an operation command for the image forming apparatus.

The communication section is configured to transmit the operation command accepted by the interface section to the image forming apparatus.

The accompanying information management section is configured to, when the interface section accepts from an operator a destination-to-save-data specifying command to specify, to the image forming apparatus, a folder on the information processing apparatus as a destination to save data output from the image forming apparatus, acquire predetermined accompanying information attached to the folder and allow the transmission section to transmit the acquired accompanying information to the image forming apparatus.

The control unit of the image forming apparatus includes an accompanying information receiving section and a destination-to-save-data specifying section.

The accompanying information receiving section is configured to receive the accompanying information output from the information processing apparatus.

The destination-to-save-data specifying section is configured to, using the accompanying information received by the accompanying information receiving section, specify the folder identified by the accompanying information as a destination to save data output from the image forming apparatus.

Another aspect of the present disclosure is an information processing apparatus. The information processing apparatus includes the interface section, the communication section, and the accompanying information management section.

Still another aspect of the present disclosure is a computer-readable non-transitory storage medium with a destination-to-save-data specifying program stored thereon. The destination-to-save-data specifying program allows an information processing apparatus to serve as the interface section, the communication section, and the accompanying information management section.

Still another aspect of the present disclosure is an image forming apparatus.

The image forming apparatus includes the accompanying information receiving section, and the destination-to-save-data specifying section.

DETAILED DESCRIPTION

Figure 1:
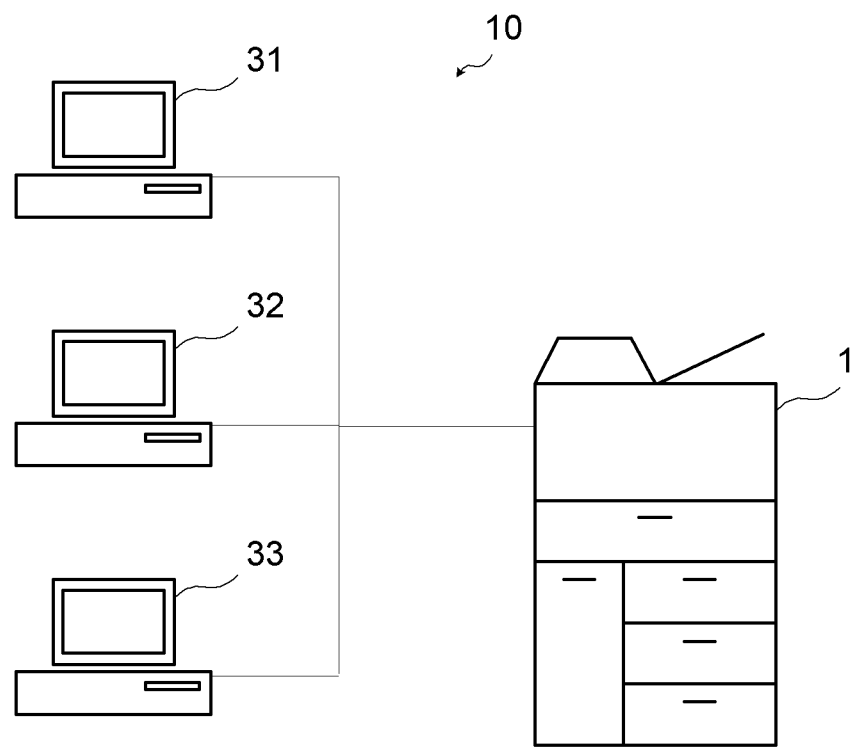
FIG. 1 is a view showing a network structure of a destination-to-save-data specifying system equipped with an image forming apparatus according to one embodiment of the present disclosure.

With reference to the drawings, a description will hereinafter be given of a destination-to-save-data specifying system, an information processing apparatus, an image forming apparatus, a destination-to-save-data specifying program, and a computer-readable non-transitory storage medium with the destination-to-save-data specifying program stored thereon, all according to an embodiment serving as one aspect of the present disclosure. FIG. 1 is a view showing a network structure of a destination-to-save-data specifying system equipped with an image forming apparatus according to one embodiment of the present disclosure.

The destination-to-save-data specifying system 10 includes an image forming apparatus 1 and at least one of computers 31, 32, 33 (an embodiment of the information processing apparatus) which are connected to each other via a network, such as LAN (local area network).

The image forming apparatus 1 is a multifunction peripheral having multiple functions including, for example, a copy function, a facsimile function a print function, and a scan function. The image forming apparatus 1 performs a copy action, a facsimile action, a scan action, and a print action, including printout of data stored in an internal memory of the image forming apparatus 1 and printout of data sent from the computers 31 to 33. The image forming apparatus 1 and the computers 31 to 33 can communicate data with each other and the image forming apparatus 1 can be remotely operated by each computer 31 to 33 (the details of the remote operation will be described later).

Figure 2:
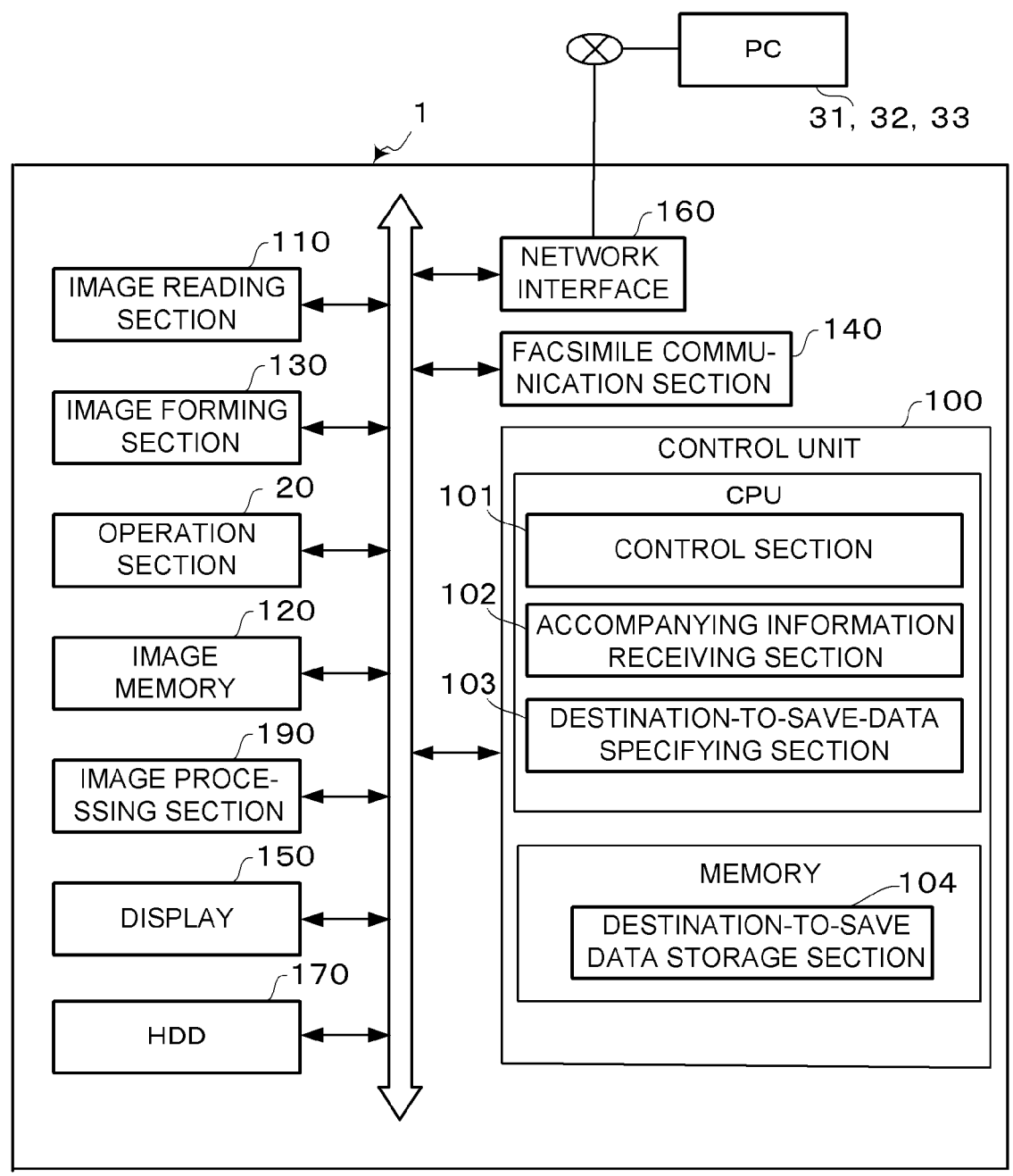
FIG. 2 is a block diagram schematically showing the internal architecture of the image forming apparatus according to the one embodiment of the present disclosure.

A schematic internal architecture of the image forming apparatus 1 will next be described. FIG. 2 is a block diagram schematically showing the internal architecture of the image forming apparatus 1.

The image forming apparatus 1 includes a control unit 100, an image reading section 110, an image memory 120, and an image forming section 130.

The image reading section 110 is composed of a scanner or the like configured to read an image of an original document.

The image memory 120 provides a region for temporarily storing data or the like of the document read by the image reading section 110 and temporarily storing data to be printed by the image forming section 130.

The image forming section 130 forms an image of data read by the image reading section 110 or an image of data transmitted from the computers 31 to 33.

The image forming apparatus 1 further includes a facsimile communication section 140 configured to perform various functions necessary for a facsimile communication and receive image data from external facsimile devices via a public line. The image forming apparatus 1 further includes an HDD (hard disk) 170 having a large storage area capable of storing document image data read by the image reading section 110 and other data.

The image forming apparatus 1 further includes an operation section 20 configured to accept entries of various operation commands from the operator and a display 150 formed of an LCD (liquid crystal display) or the like and configured to display operation guidance and the like for the operator. The display 150 may also have a touch panel function to serve as the operation section 20 and accept various operation commands from the operator.

The image forming apparatus 1 further includes an image processing section 190 configured to perform the edition and processing (coding/decoding, scaling up/down, compression/expansion) of image data read by the image reading section 110, and a network interface 160 for use to communicate various data with the computers 31 to 33.

The control unit 100 is formed of a CPU and a memory or the like. The control unit 100 includes a control section 101, an accompanying information receiving section 102, a destination-to-save-data specifying section 103, and a destination-to-save-data storage section 104.

The HDD 170 or an unshown ROM stores a data output control program and a destination-to-save-data registration program. The control unit 100 performs an SMB (server massage block) transmission function through the operation of the CPU or the like according to the data output control program. The SMB transmission function is the function of transmitting data acquired by the image forming apparatus 1 through, for example, the scanning of the image reading section 110, to a shared folder on a computer designated by the operator from among the computers 31 to 33 on the network.

Furthermore, the control unit 100 operates according to the destination-to-save-data registration program to perform various processings for specifying a folder serving as a destination to save data in performing the SMB transmission function. In this embodiment, the CPU or the like of the control unit 100 operates according to the destination-to-save-data registration program to serve as the accompanying information receiving section 102 and the destination-to-save-data specifying section 103, and the accompanying information receiving section 102 and the destination-to-save-data specifying section 103 perform various processings for specifying the destination to save data.

However, each of the accompanying information receiving section 102 and the destination-to-save-data specifying section 103 of the control unit 100 may be constituted not by the operation of the control unit 100 according to the destination-to-save-data registration program but by a hardware circuit.

The control section 101 governs the overall operation of the image forming apparatus 1. For example, the control section 101 controls various operation mechanisms included in the image forming apparatus 1 based on operation commands entered into the operation section 20 by the operator. The control section 101 performs various processings necessary for the SMB transmission function based on the data output control program.

The accompanying information receiving section 102 is configured to receive predetermined accompanying information output from the computers 31 to 33 and transmitted via the network and the network interface 160. Furthermore, if a password to be described later is transmitted from the computers 31 to 33, the accompanying information receiving section 102 receives the password. The predetermined accompanying information contains a host name, a path name, and a user name for a holder serving as a candidate for a destination to save data output from the image forming apparatus 1 using the SMB transmission function and is information to be used when, in the image forming apparatus 1, the folder is specified as the destination to save data. The password is used for the determination of whether to permit the access to the folder upon data output using the SMB transmission function.

The destination-to-save-data specifying section 103 uses the accompanying information and password received by the accompanying information receiving section 102 to specify the folder identified by the accompanying information as a destination to save data output from the image forming apparatus 1 using the SMB transmission function and register the folder on the destination-to-save-data storage section 104.

The destination-to-save-data storage section 104 stores a plurality of destinations to save individual data output from the image forming apparatus 1 using the SMB transmission function. The destination-to-save-data storage section 104 stores, for each folder serving as a destination to save data, a host name, a path name, a user name, and, if receiving a password, the password, which are indicated by the accompanying information.

Figure 3:
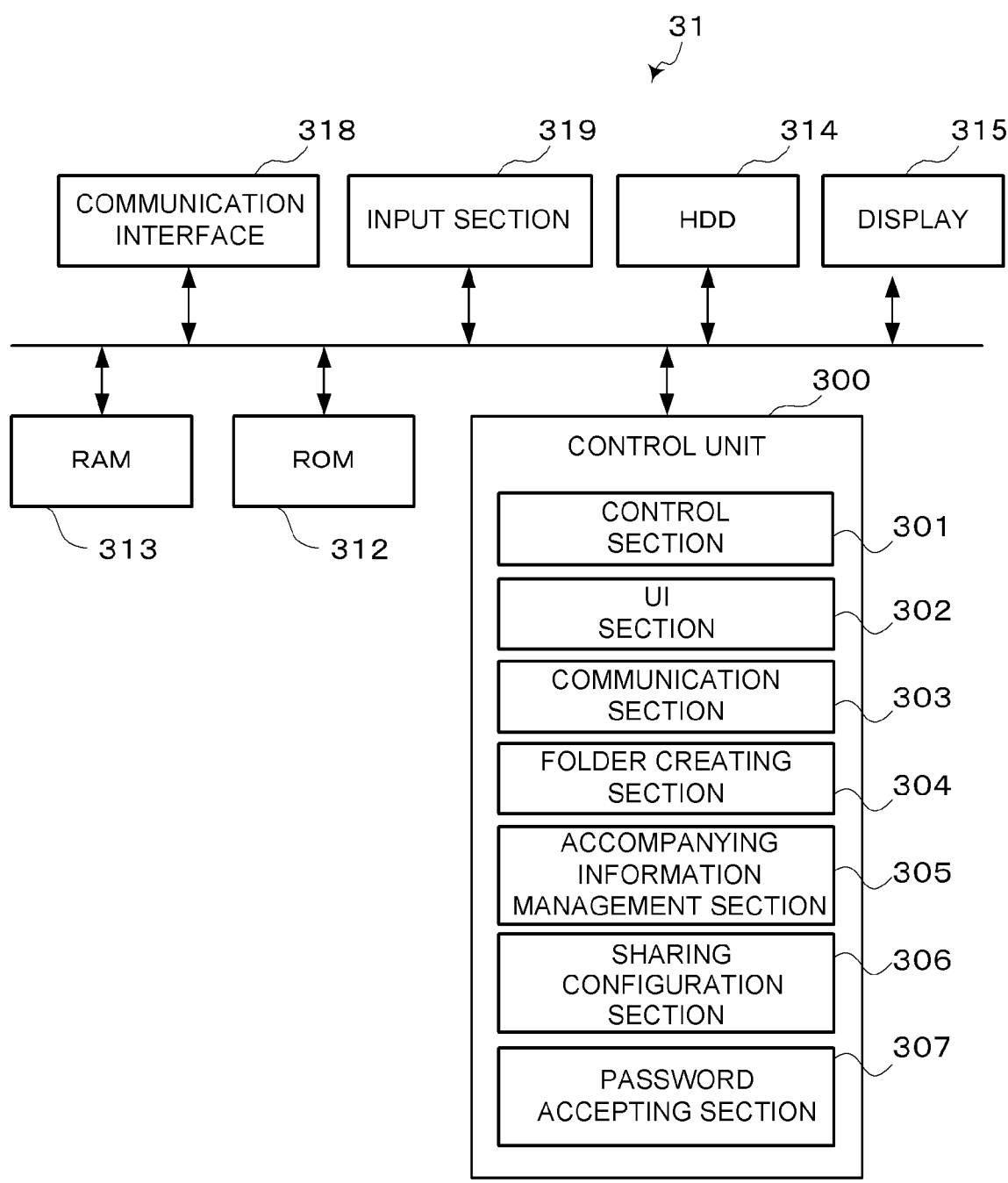
FIG. 3 is a block diagram schematically showing the internal architecture of a computer according to the one embodiment of the present disclosure.

A schematic internal architecture of the computer 31 to 33 will next be described. FIG. 3 is a block diagram schematically showing the internal architecture of the computer 31.

The computers 32, 33 have the same architecture as the computer 31 and further explanation thereof will be accordingly omitted.

The computer 31 includes a control unit 300, a ROM 312, a RAM 313, an HDD 314, a display 315, a communication interface 318, and an input section 319. These unit and sections can transfer data or signals to and from one another via a CPU bus.

The control unit 300 is formed of a CPU or the like. The ROM 312 stores an operating program on basic operations of the computer 31. The RAM 313 is used as an operating region of the control unit 300 and for other purposes.

The HDD 314 can store, in part of its storage region, various types of data including text data and image data to be printed. Furthermore, the storage region of the HDD 314 stores folders created by a folder creating section 304.

Moreover, a destination-to-save-data specifying program is stored (installed) on the HDD 314. The destination-to-save-data specifying program is a program for transmitting to the image forming apparatus 1 the accompanying information, the password, and so on attached to the folder created on the computer 31. The control unit 300 serves as a user interface (UI) section 302, a communication section 303, an accompanying information management section 305, and a password accepting section 307, all of which will be described in detail later, through the operation of its CPU or the like according to the destination-to-save-data specifying program. A computer-readable non-transitory storage medium with the destination-to-save-data specifying program stored thereon is also one embodiment of the present disclosure.

The destination-to-save-data specifying program contains a remote program. The remote program is a program for allowing the display 315 of the computer 31 to display a display screen of the display 150 of the image forming apparatus 1 or an operation screen representing the operation section 20 and performing a remote panel function which enables the computer 31 to remotely operate the image forming apparatus 1.

The display 315 is formed of an LCD (liquid crystal display) or the like and displays contents of various data, and operation guidance and the like for the operator operating the computer 31. The communication interface 318 serves as an interface for data communication with the image forming apparatus 1 and the other computers 32, 33.

The input section 319 is formed of a keyboard, a mouse or the like, through which various operation commands are entered into the image forming apparatus 1 by the operator.

The control unit 300 includes a control section 301, the user interface (UI) section 302, the communication section 303, the folder creating section 304, the accompanying information management section 305, a sharing configuration section 306, and the password accepting section 307.

The control section 301 governs the overall operation control of the computer 31.

The user interface section 302 allows the display 315 to display a display screen of the display 150 of the image forming apparatus 1 or an operation screen representing the operation section 20. Furthermore, when a portion of the operation screen corresponding to a desired operation button of those of the operation section 20 is designated by the operator's pointing of a mouse pointer serving as the input section 319, the user interface section 302 accepts an operation command for the operation and function of the image forming apparatus 1 associated with the operation button displayed on the designated portion of the operation screen. The user interface section 302 is an example of the interface section defined in "CLAIMS".

The communication section 303 controls the transmission of the operation command accepted by the user interface section 302 to the image forming apparatus 1.

The folder creating section 304 creates, based on the command from the operator, a folder accompanied by such predetermined accompanying information as described above. The CPU or the like of the control unit 300 operates according to an OS (operating system) program running in the background and thus serves as the folder creating section 304. The folder is a logical unit in which data is stored or recorded on a personal computer. As described previously, the predetermined accompanying information is information which contains a host name, a path name, a user name, and so on for a folder and is generally to be attached to the folder upon creation of the folder.

The accompanying information management section 305 performs, for example, the processing of, when the user interface section 302 accepts an operator's destination-to-save-data specifying command to specify, to the image forming apparatus 1, a folder created by the folder creating section 304 as a destination to save data output from the image forming apparatus 1, acquiring the above accompanying information from the folder and allowing the communication section 303 to transmit the acquired accompanying information to the image forming apparatus 1.

The sharing configuration section 306 performs a sharing configuration processing for configuring the sharing of the folder created by the folder creating section 304. The sharing configuration is a configuration for permitting an authorized person to access to a folder and/or open the folder and enabling sharing of the folder or data in the folder with the person. In this embodiment, the HDD 314 stores a known program for automatically performing the sharing configuration of folders. When the CPU or the like of the control unit 300 operates according to the above program, the control unit 300 serves as the sharing configuration section 306.

The password accepting section 307 accepts an operator's entry of a password if the user interface section 302 accepts a destination-to-save-data specifying command for the folder from the operator. As described previously, the password is used for the determination in the image forming apparatus 1 of whether to permit the access to the folder. The password accepted by the password accepting section 307 is transmitted together with the accompanying information to the image forming apparatus 1 by the communication section 303 allowed to do so by the accompanying information management section 305.

Figure 4:
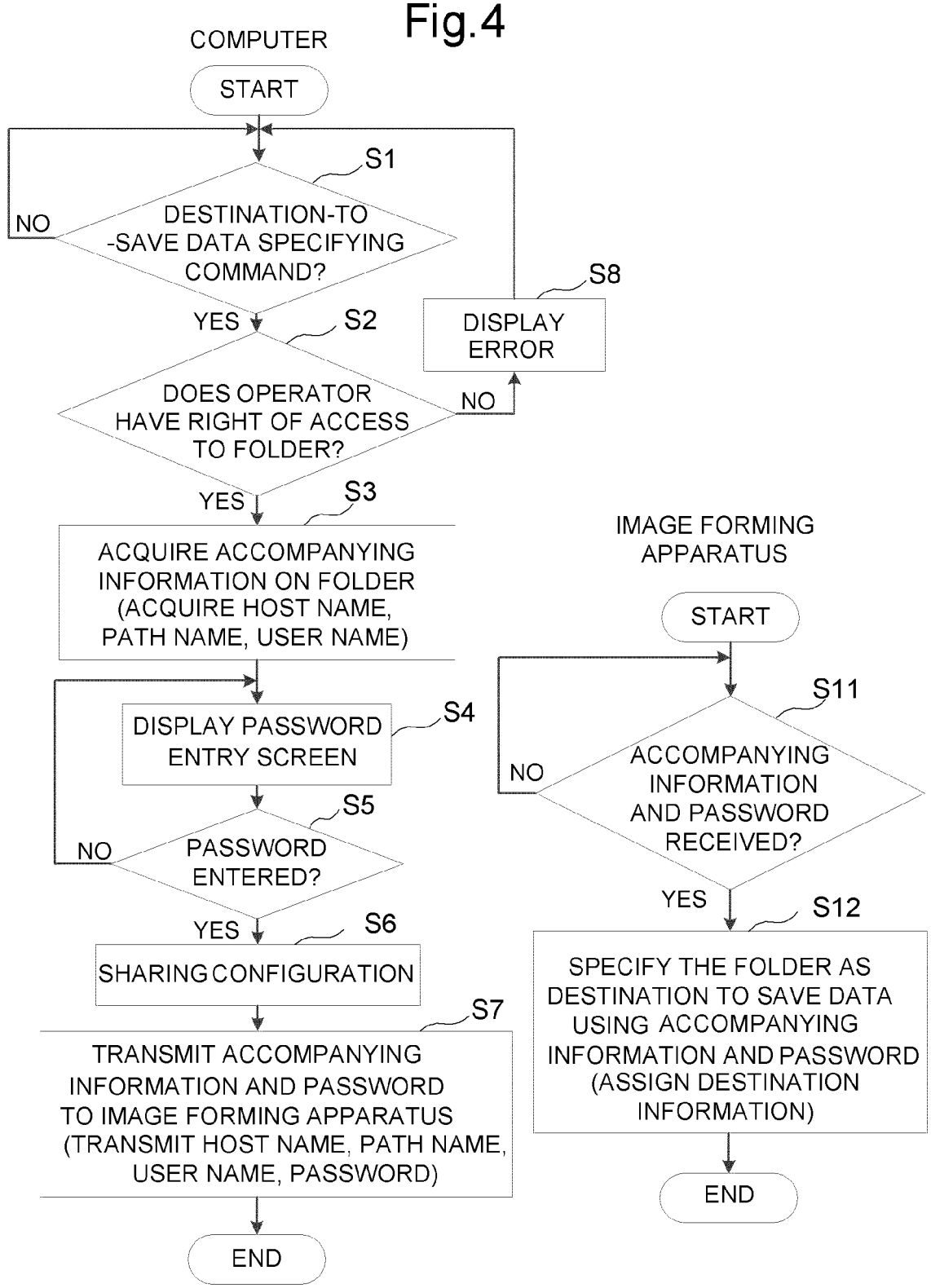
FIG. 4 is a flowchart showing a destination-to-save-data specifying processing of the destination-to-save-data specifying system according to the one embodiment of the present disclosure.
Figure 5:
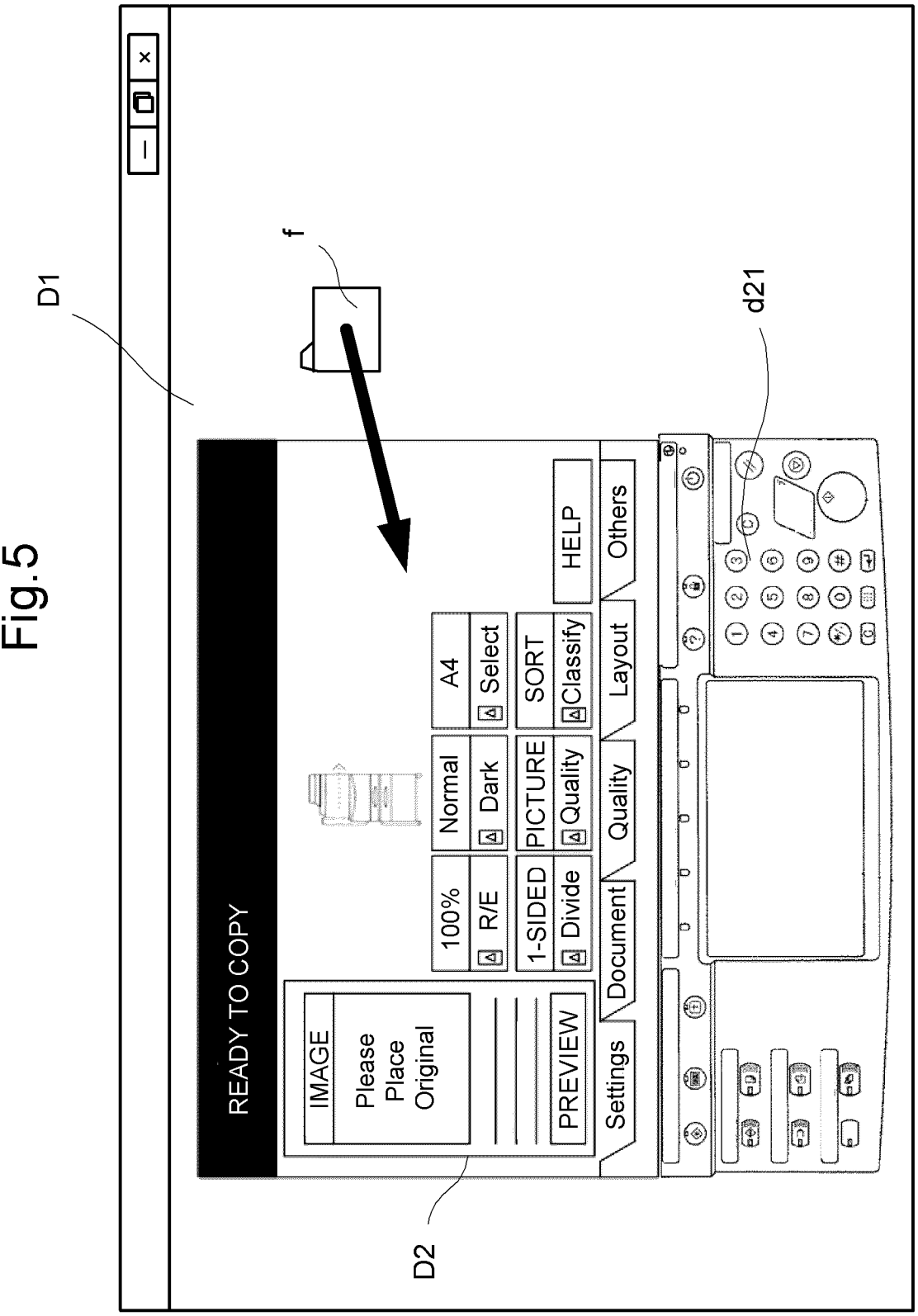
FIG. 5 is a view showing an example of a display screen of a display of the computer according to the one embodiment of the present disclosure.
Figure 6:
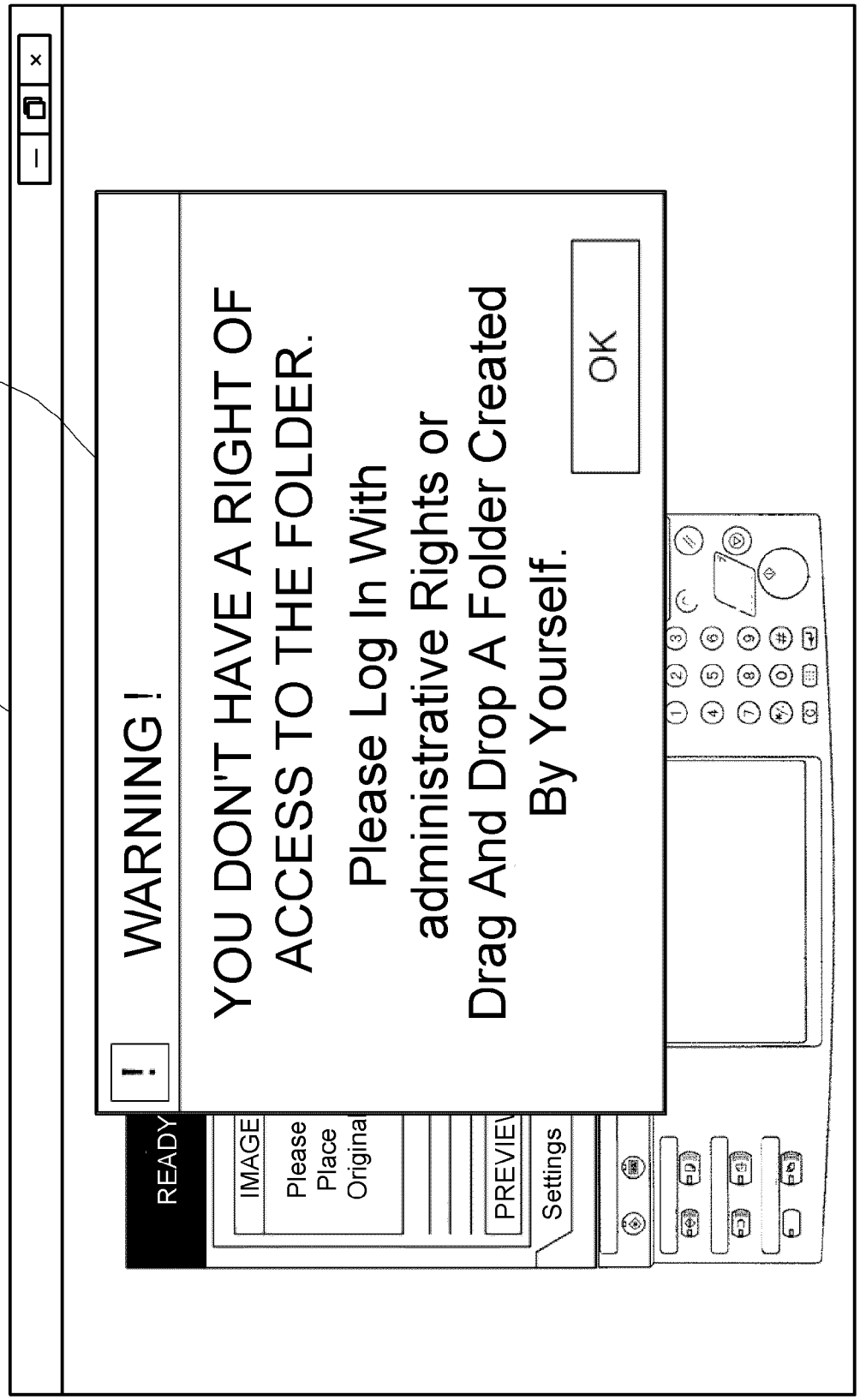
FIG. 6 is a view showing another example of a display screen of the display of the computer according to the one embodiment of the present disclosure.
Figure 7:
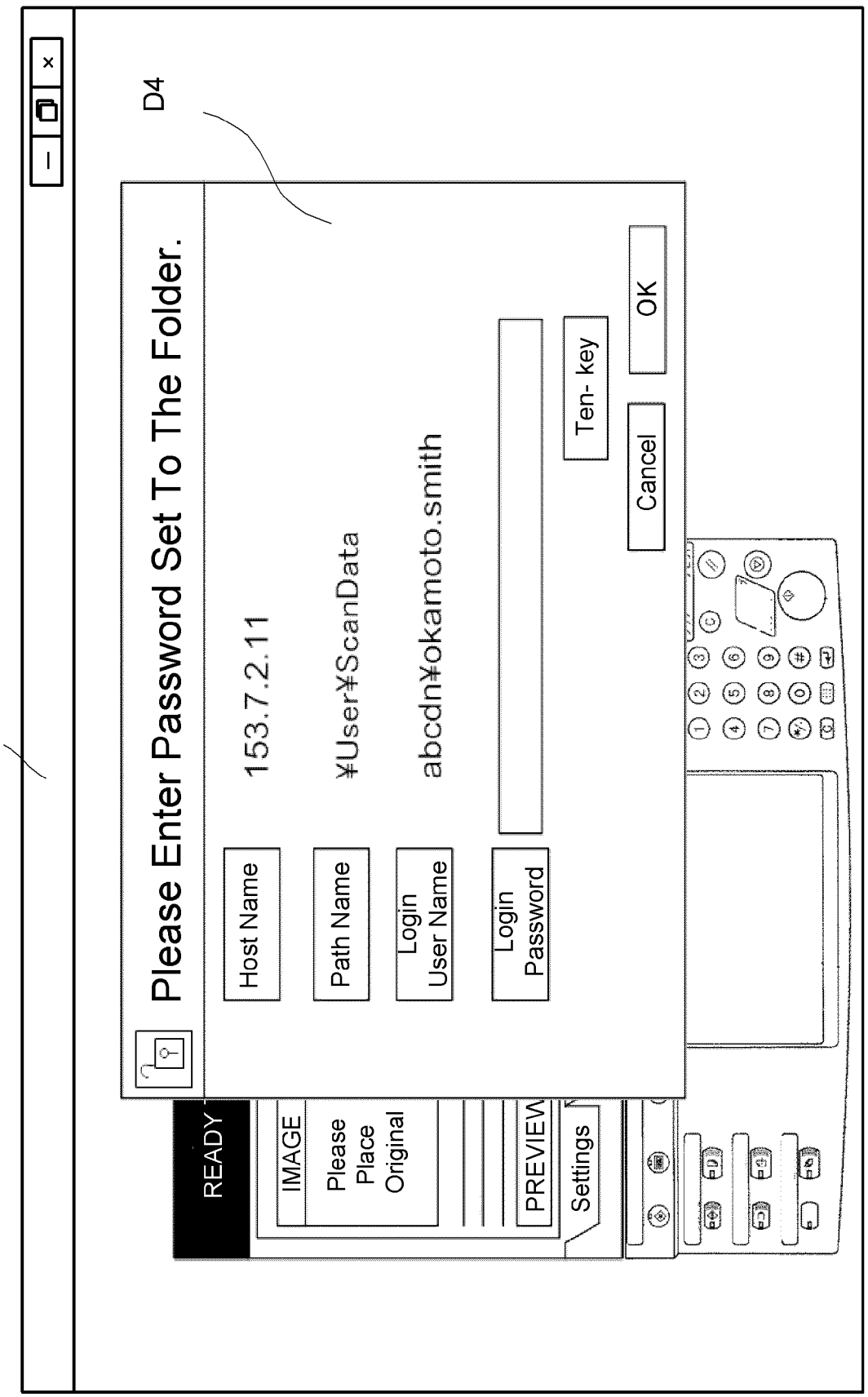
FIG. 7 is a view showing still another example of a display screen of the display of the computer according to the one embodiment of the present disclosure.
Figure 8:
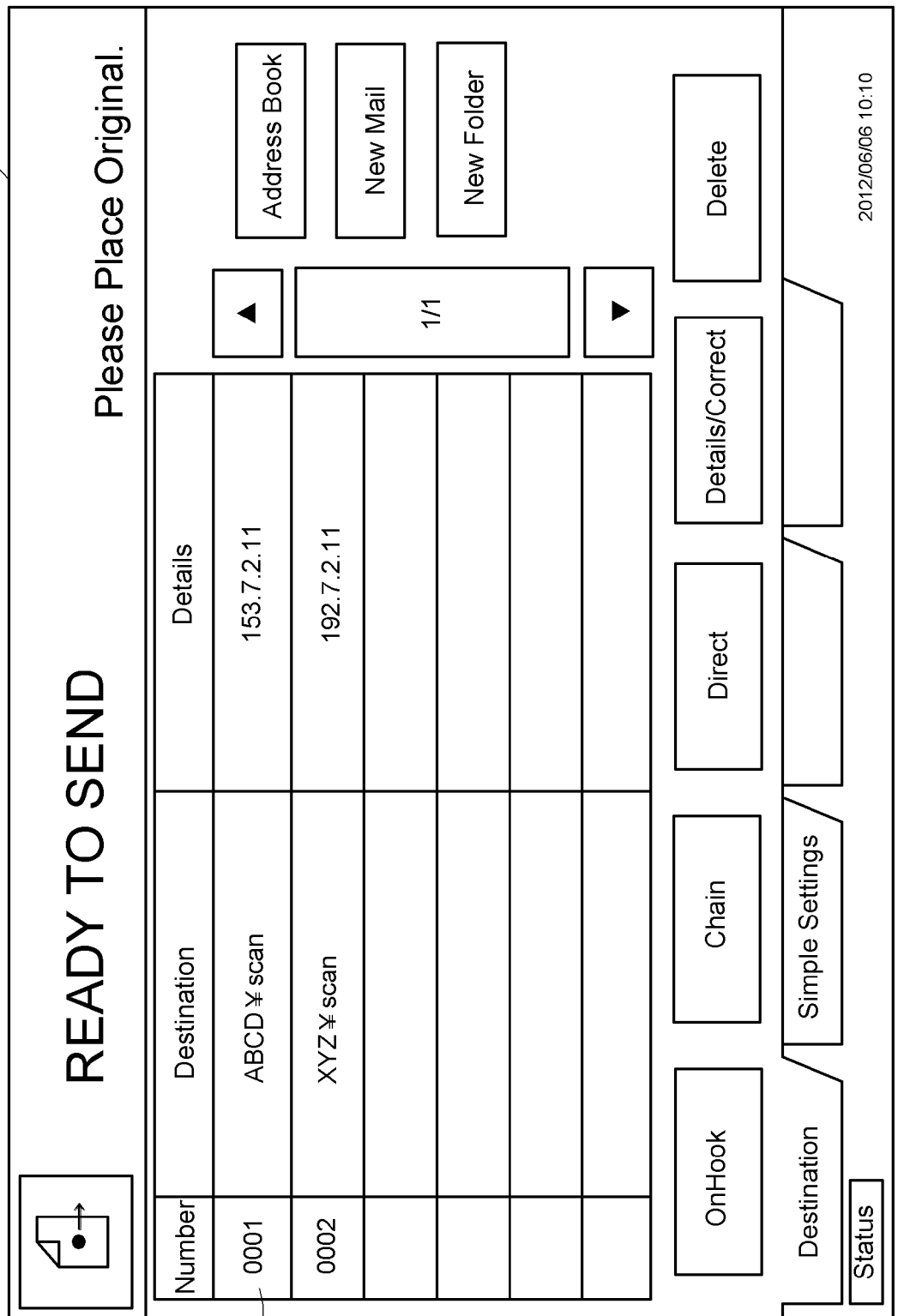
FIG. 8 is a view showing an example of a display screen of a display of the image forming apparatus according to the one embodiment of the present disclosure.

The destination-to-save-data specifying processing of the destination-to-save-data specifying system 10 will next be described. FIG. 4 is a flowchart showing the destination-to-save-data specifying processing of the destination-to-save-data specifying system 10. FIGS. 5 to 7 are views showing examples of a display screen of the display 315 of the computer 31. FIG. 8 is a view showing an example of a display screen of the display 150 of the image forming apparatus 1. The processing of specifying a folder on a computer as a destination to save data is common to the computers 31 to 33. Therefore, the following description takes as an example the case where the destination-to-save-data specifying processing is performed through the computer 31.

In the computer 31, a folder accompanied by the above-mentioned accompanying information, i.e., the host name, the path name, and the user name for the folder, is already created by the folder creating section 304 based on an operator's command entered through the input section 319. This folder is stored in a predetermined storage region of the HDD 314. As illustrated by an example in FIG. 5, a folder image f representing the folder is displayed within a display screen D1 of the display 315 by the display control of the control section 301.

Furthermore, the user interface section 302 causes an operation screen D2 to be displayed on a portion of the display screen D1 and, in this state, waits for an entry of an operation command for operation and function of the image forming apparatus 1 from the operator. The operation screen D2 is composed of a screen image for accepting an operation command, which is also displayed on the display 150 of the image forming apparatus 1, and an image representing the operation section 20 of the image forming apparatus 1. Upon operator's pointing of the mouse pointer in this state, for example, upon operator's designation of a start button image d21 in the operation screen D2 shown in FIG. 5, the user interface section 302 accepts an entry of a command to start a copy action associated with the start button image d21.

While in this manner the user interface section 302 causes the operation screen D2 to be displayed and waits for an entry of an operation command from the operator, the operator drags and drops the folder image f anywhere on the operation screen D2 using the mouse pointer as shown by the arrow in FIG. 5. Thus, a destination-to-save-data specifying command for the folder represented by the folder image f is accepted by the user interface section 302 (YES in S1).

When the user interface section 302 accepts the destination-to-save-data specifying command for the folder designated as a destination to save data, the accompanying information management section 305 determines whether or not the operator having entered the destination-to-save-data specifying command has a right of access to the folder (S2). For example, the accompanying information management section 305 acquires right information indicating the right of access to the folder and managed by the OS program running in the background. The accompanying information management section 305 determines that the operator has the right of access to the folder if the acquired right information contains the user name of the operator logging in the computer 31, whereas it determines that the operator does not have the right of access to the folder if the right information does not contain the user name of the operator.

If the accompanying information management section 305 determines that the operator does not have the right of access to the folder (NO in S2), it allows the display 315 to display a warning (error) screen D3 as illustrated by an example in FIG. 6 (S8). Thereafter, the process is repeated from S1.

On the other hand, if the accompanying information management section 305 determines that the operator has the right of access to the folder (YES in S2), the accompanying information management section 305 acquires the accompanying information on the folder managed by the OS program (S3). Specifically, the accompanying information management section 305 acquires the host name, the path name, and the user name for the folder designated as a destination to save data.

Then, the password accepting section 307 allows the display 315 to display a password entry screen D4 for prompting the operator to enter a password (S4) as illustrated by an example in FIG. 7 and waits for an entry of the password from the operator (S5). The password accepting section 307 causes the password entry screen D4 to display, for example, the host name, the path name, and the user name already acquired in relation to the folder. The password accepting section 307 leaves the display 315 displaying the password entry screen D4 until the operator enters the password (NO in S5, S4).

When the password is entered through the operation of the input section 319 by the operator (YES in S5), the sharing configuration section 306 subsequently performs configuration for sharing the folder specified as the destination to save data by the destination-to-save-data specifying command accepted in S1 (S6).

After the sharing configuration section 306 configures the sharing of the folder, the accompanying information management section 305 allows the communication section 303 to transmit to the image forming apparatus 1 the accompanying information containing the host name, the path name, and the user name for the folder, which is the accompanying information acquired in S3, and the password accepted by the password accepting section 307 in S6 (S7).

When in the image forming apparatus 1 the accompanying information and the password are received by the accompanying information receiving section 102 (YES in S11), the destination-to-save-data specifying section 103 uses the accompanying information and password received by the accompanying information receiving section 102 to specify the folder identified by the accompanying information as a destination to save data output from the image forming apparatus 1 using the SMB transmission function and register the folder on the destination-to-save-data storage section 104 (S12). In doing so, the destination-to-save-data specifying section 103 assigns to the folder serving as a destination to save data, destination information, i.e., the host name and the path name contained in the accompanying information on the folder. For example, a command to send data to the folder specified as a destination to save data is entered from the image forming apparatus 1 through the operation of the operation section 20 by the operator. In this case, if the password entered into the operation section 20 by the operator is identical to the password for the folder registered on the destination-to-save-data storage section 104, the control section 101 provides the control of data sending to the folder via the network interface 160.

In the image forming apparatus 1, during the operation of designating a destination to save data in the case of outputting data, such as a file, to a folder on one of the computers 31 to 33 on the network using the SMB transmission function and storing the data in the folder, the control section 101 reads the destinations to save data stored on the destination-to-save-data storage section 104 and allows the display 150 to display a destination-to-save-data designating screen D5 indicating the read destinations to save data as candidates for designating the destination to save data as illustrated by an example in FIG. 8. In addition, after the folder serving as a destination to save data is specified (S12), an image d51 representing the folder serving as a destination to save data specified in S12 is also displayed on the destination-to-save-data designating screen D5. In the image d51, the destination for the associated folder is indicated using the assigned destination information, which enables distinguishing of the folder from the other folders specified as destinations to save data.

For example, when the operator enters a command to designate one of the folders on the computers 31 to 33 serving as a destination to save data through the operation of the operation section 20 of the image forming apparatus 1, the control section 101 sends the data designated by the operator via the network interface 160 to the designated folder.

In this embodiment, for example, in specifying a folder serving as a destination to save data in order that data output from the image forming apparatus 1 to the computer 31 to 33 using the SMB transmission function is stored in any folder on the computer 31 to 33, the operator's work for setting the host name, the path name, the user name, the password, and so on for the folder to the image forming apparatus 1 can be eliminated. Thus, the workload of specifying the destination to save data can be reduced.

Furthermore, since the sharing configuration sections 306 of the computers 31 to 33 perform configuration for sharing the folder specified as a destination to save data based on the destination-to-save-data specifying command, there is no need for the operator to engage, on the information processing apparatuses, in configuring the sharing of the folder serving as a destination to save data when specifying the destination to save data. Thus, the workload of specifying the destination to save data can be further reduced.

Moreover, only if the operator having issued the destination-to-save-data specifying command has a right of access to the folder specified as a destination to save data, the accompanying information management section 305 of the computer 31 to 33 acquire the accompanying information from the folder and allow the communication section 303 to transmit it to the image forming apparatus 1. Therefore, it can be prevented that any person having no right of access to the folder specifies the folder as a destination to save data without leave.

The accompanying information management section 305 allows the communication section 303 to transmit the password accepted from the operator by the password accepting section 307 together with the accompanying information to the image forming apparatus 1 and the destination-to-save-data specifying section 103 in the image forming apparatus 1 specifies the folder serving as a destination to save data using the accompanying information and the password. Therefore, in specifying the destination to save data, the operator can set a password for the folder, which would conventionally be needed to be set on the image forming apparatus, upon entry of the destination-to-save-data specifying command on the information processing apparatus. Thus, the workload of specifying the destination to save data can be further reduced.

The user interface section 301 allows the display 315 to display the operation screen D2 as an accepting image for accepting an operation command from the operator and, when a folder image f displayed on the display 315 and serving as a destination-to-save-data display image representing a destination to save data is dragged and dropped onto the operation screen D2 through an operation of the operator, accepts the folder represented by the folder image f as a destination to save data output from the image forming apparatus 1. This increases the operator friendliness of the work for specifying the destination to save data on the computers 31 to 33.

The present disclosure is not limited to the configurations of the above embodiment and can include various modifications. For example, in the above-mentioned destination-to-save-data specifying processing, the accompanying information management section 305 allows the communication section 303 to transmit the password accepted by the password accepting section 307, together with the accompanying information, to the image forming apparatus 1. However, it is possible that the computer 31 may not include the password accepting section 307, the accompanying information management section 305 may allow the communication section 303 to transmit only the accompanying information to the image forming apparatus 1, the password may be entered on the image forming apparatus 1, and the destination-to-save-data specifying section 103 of the image forming apparatus 1 may allow the destination-to-save-data storage section 104 to store the folder serving as a destination to save data using the accompanying information and the entered password.

In the above-mentioned destination-to-save-data specifying processing, the sharing configuration section 306 performs the configuration for sharing the folder in S6. However, if the sharing configuration section 306 has already configured the sharing of the folder prior to the destination-to-save-data specifying processing, the configuration for sharing the folder in S6 is not performed during the destination-to-save-data specifying processing.

The configurations and processings shown in the above embodiment with reference to FIGS. 1 to 8 are merely one embodiment of the subject matter shown by the present disclosure and the subject matter of the present disclosure is not intended to be limited to these configurations and processings.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A destination-to-save-data specifying system including: a control unit assembled in an information processing apparatus; and a control unit assembled in an image forming apparatus configured to communicate with the information processing apparatus, wherein the control unit of the information processing apparatus includes:

an interface section configured to accept an operation command for the image forming apparatus;

a communication section configured to transmit the operation command accepted by the interface section to the image forming apparatus; and an accompanying information management section configured to, when the interface section accepts from an operator a destination-to-save-data specifying command to specify, to the image forming apparatus, a folder on the information processing apparatus as a destination to save data output from the image forming apparatus, acquire predetermined accompanying information attached to the folder and allow the transmission section to transmit the acquired accompanying information to the image forming apparatus, and wherein the control unit of the image forming apparatus includes:

an accompanying information receiving section configured to receive the accompanying information output from the information processing apparatus;

a destination-to-save-data specifying section configured to, using the accompanying information received by the accompanying information receiving section, specify the folder identified by the accompanying information as a destination to save data output from the image forming apparatus; and a password accepting section configured to, if the interface section accepts the destination-to-save-data specifying command for the folder from the operator, accept from an operator's entry of a password for use in determination in the image forming apparatus of whether to permit the access to the folder, wherein the accompanying information management section is configured to allow the communication section to transmit the password accepted by the password accepting section, together with the accompanying information, to the image forming apparatus, the accompanying information receiving section of the image forming apparatus is configured to receive the accompanying information and the password, and the destination-to-save-data specifying section is configured to, using the received accompanying information and password, specify the folder identified by the accompanying information as a destination to save data output from the image forming apparatus.

2. A destination-to-save-data specifying system including: a control unit assembled in an information processing apparatus; and a control unit assembled in an image forming apparatus configured to communicate with the information processing apparatus, wherein the control unit of the information processing apparatus includes:

an interface section configured to accept an operation command for the image forming apparatus;

a communication section configured to transmit the operation command accepted by the interface section to the image forming apparatus; and an accompanying information management section configured to, when the interface section accepts from an operator a destination-to-save-data specifying command to specify, to the image forming apparatus, a folder on the information processing apparatus as a destination to save data output from the image forming apparatus, acquire predetermined accompanying information attached to the folder and allow the transmission section to transmit the acquired accompanying information to the image forming apparatus, and wherein the control unit of the image forming apparatus includes:

an accompanying information receiving section configured to receive the accompanying information output from the information processing apparatus; and a destination-to-save-data specifying section configured to, using the accompanying information received by the accompanying in information receiving section specify the folder identified by the accompanying information as a destination to save data output from the image forming apparatus, wherein the interface section of the control unit of the information processing apparatus is configured to allow a display of the information processing apparatus to display an accepting image for accepting the operation command and, when a destination-to-save-data display image displayed on the display and representing a destination to save data is dragged and dropped onto the accepting image through an operation of the operator, accept the destination to save data represented by the destination-to-save-data display image as a destination to save data output from the image forming apparatus.

3. An information processing apparatus including:

an interface section configured to accept an operation command for an image forming apparatus connected to the information processing apparatus;

a communication section configured to transmit the operation command accepted by the interface section to the image forming apparatus;

an accompanying information management section configured to, when the interface section accepts from an operator a destination-to-save-data specifying command to specify, to the image forming apparatus, a folder on the information processing apparatus as a destination to save data output from the image forming apparatus, acquire predetermined accompanying information attached to the folder and allow the transmission section to transmit the acquired accompanying information to the image forming apparatus; and a password accepting section configured to, if the interface section accepts the destination-to-save-data specifying command for the folder from the operator, accept an operator's entry of a password for use in determination in the image forming apparatus of whether to permit the access to the folder, wherein the accompanying information management section is configured to allow the communication section to transmit the password accepted by the password accepting section, together with the accompanying information, to the image forming apparatus.

4. An information processing apparatus including:

an interface section configured to accept an operation command for an image forming apparatus connected to the information processing apparatus;

a communication section configured to transmit the operation command accepted by the interface section to the image forming apparatus; and an accompanying information management section configured to, when the interface section accepts from an operator a destination-to-save-data specifying command to specify, to the image forming apparatus, a folder on the information processing apparatus as a destination to save data output from the image forming apparatus, acquire predetermined accompanying information attached to the folder and allow the transmission section to transmit the acquired accompanying information to the image forming apparatus, wherein the interface section is configured to allow a display of the information processing apparatus to display an accepting image for accepting the operation command and, when a destination-to-save-data display image displayed on the display and representing a destination to save data is dragged and dropped onto the accepting image through an operation of the operator, accept the destination to save data represented by the destination-to-save-data display image as a destination to save data output from the image forming apparatus.

5. A computer-readable non-transitory storage medium with a destination-to-save-data specifying program stored thereon, wherein the destination-to-save-data specifying program allows an information processing apparatus to serve as:

an interface section configured to accept an operation command for an image forming apparatus connected to the information processing apparatus;

a communication section configured to transmit the operation command accepted by the interface section to the image forming apparatus;

an accompanying information management section configured to, when the interface section accepts from an operator a destination-to-save-data specifying command to specify, to the image forming apparatus, a folder on the information processing apparatus as a destination to save data output from the image forming apparatus, acquire predetermined accompanying information from the folder and allow the transmission section to transmit the acquired accompanying information to the image forming apparatus; and a password accepting section configured to, if the interface section accepts the destination-to-save-data specifying command for the folder from the operator, accept an operator's entry of a password for use in determination in the image forming apparatus of whether to permit the access to the folder, wherein the accompanying information management section is configured to allow the communication section to transmit the password accepted by the password accepting section, together with the accompanying information, to the image forming apparatus.

6. A computer-readable non-transitory storage medium with a destination-to-save-data specifying program stored thereon, wherein the destination-to-save-data specifying program allows an information processing apparatus to serve as:

an interface section configured to accept an operation command for an image forming apparatus connected to the information processing apparatus;

a communication section configured to transmit the operation command accepted by the interface section to the image forming apparatus; and an accompanying information management section configured to, when the interface section accepts from an operator a destination-to-save-data specifying command to specify, to the image forming apparatus, a folder on the information processing apparatus as a destination to save data output from the image forming apparatus, acquire predetermined accompanying information from the folder and allow the transmission section to transmit the acquired accompanying information to the image forming apparatus, wherein the interface section is configured to allow a display of the information processing apparatus to display an accepting image for accepting the operation command and, when a destination-to-save-data display image displayed on the display and representing a destination to save data is dragged and dropped onto the accepting image through an operation of the operator, accept the destination to save data represented by the destination-to-save-data display image as a destination to save data output from the image forming apparatus.

* * * * *